US00RE37995E

(19) United States
(12) Reissued Patent
Barrus et al.

(10) Patent Number: US RE37,995 E
(45) Date of Reissued Patent: Feb. 18, 2003

(54) PROGRESSIVE CAVITY PUMP WITH FLEXIBLE COUPLING

(75) Inventors: Donald J. Barrus, Los Alamitos, CA (US); Steven K. Tetzlaff, Riverside, CA (US)

(73) Assignee: Baker Hughes Incorporated, Houston, TX (US)

(21) Appl. No.: 08/932,718

(22) Filed: Sep. 17, 1997

Related U.S. Patent Documents

Reissue of:
(64) Patent No.: 5,501,580
Issued: Mar. 26, 1996
Appl. No.: 08/437,205
Filed: May 8, 1995

(51) Int. Cl.[7] ..... F04B 17/00; F01C 1/10
(52) U.S. Cl. ..... 417/410.3; 417/360; 418/48; 166/107
(58) Field of Search ..... 418/48, 182; 417/360, 417/424.2, 424.1, 410.3, 319; 166/107

(56) References Cited

U.S. PATENT DOCUMENTS

| | | | | | |
|---|---|---|---|---|---|
| 3,677,665 | A | * | 7/1972 | Corkill | 417/410 |
| 3,760,447 | A | * | 9/1973 | Vivion | 418/48 |
| 4,011,917 | A | * | 3/1977 | Tirapuzsky et al. | 418/48 |
| 4,386,654 | A | * | 6/1983 | Becker | 166/106 |
| 4,449,953 | A | * | 5/1984 | Nikomarov et al. | 418/48 |
| 4,518,049 | A | * | 5/1985 | Baldenko et al. | 418/48 |
| 4,718,824 | A | * | 1/1988 | Cholet et al. | 417/14 |
| 4,990,070 | A | * | 2/1991 | Maruyama | 418/48 |
| 5,085,564 | A | * | 2/1992 | Naylor et al. | 418/48 |
| 5,097,902 | A | * | 3/1992 | Clark | 418/48 |
| 5,407,337 | A | * | 4/1995 | Appleby | 418/48 |

FOREIGN PATENT DOCUMENTS

| | | | | |
|---|---|---|---|---|
| JP | 2181081 | * | 7/1990 | 418/48 |
| SU | 1476196 | * | 4/1989 | 418/48 |

OTHER PUBLICATIONS

Field Experiences with Progressive Cavity Pumps and New Developments by Detlef Jacobs, Harold Schulenberg BEB Erdgas Erdol, SIPM Artificial Lift Conference, Jun. 1992.*

* cited by examiner

*Primary Examiner*—Charles G. Freay
(74) *Attorney, Agent, or Firm*—Bracewell & Patterson, L.L.P.

(57) ABSTRACT

A progressive cavity pump located in a well and driven by a downhole electrical motor. A connector locates between the drive shaft of the motor and the rotor of the pump. The connector includes a connector shaft which has a lower end restrained on a longitudinal axis. The upper end orbits with the lower end of the rotor. The connector shaft has splined ends that are received in couplings. The connector shaft flexes during the orbiting movement.

12 Claims, 2 Drawing Sheets

PROGRESSIVE CAVITY PUMP WITH FLEXIBLE COUPLING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to well pumps of a progressive cavity type using a downhole electric motor, and in particular to a flexible connector for connecting the rotor of a progressive cavity pump to the drive shaft of the motor.

2. Description of the Prior Art

A progressive cavity pump is a type of pump that has a helical metal rotor that is rotated within an 11 elastomeric stator that has double helical cavities. Rotating the rotor forces the liquid from an intake end to an output end.

The rotor will rotate in an eccentric or orbiting motion. This complicates the means for driving the rotor. In one type of assembly, a downhole electric motor is installed with the pump. Electrical power is supplied to the motor for rotating the pump. The motor has a drive shaft that rotates on an axis, not eccentrically. Various connector assemblies have been devised to accommodate the orbiting movement of the lower end of the rotor. One type employs U-joints on ends of a connector shaft. The U-joints allow the rotor end to orbit while the drive shaft end remains on the axis. The connector shaft remain straight and inflexible during operation. While workable, U-joints wear.

SUMMARY OF THE INVENTION

In this invention, a connector assembly is provided for a progressive cavity pump that uses a connector shaft that flexes. The rotor end and the drive shaft end of the connector shaft are splined. A rotor coupling connects the splined rotary end to the connector shaft. A drive shaft coupling connects the splined drive shaft end to the drive shaft. A guide bushing restrains the drive shaft coupling from orbiting. The shaft is a solid metal member, such of as steel. Its length and diameter are selected so that it will flex and accommodate the orbiting movement of its rotary end. The length and diameter is also selected so that the downthrust transmitted along the shaft to a thrust bearing in a seal section below the connector will not cause the shaft to buckle.

DETAILED DESCRIPTION OF THE PREFERRED EMBODIMENT

Figure 1:
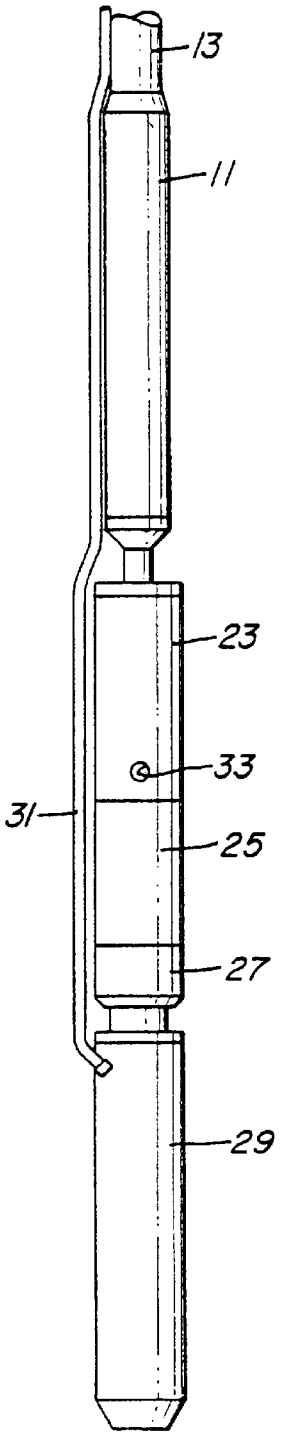
FIG. 1 is a side elevational view illustrating a progressive cavity well pump assembly.
Figure 2:
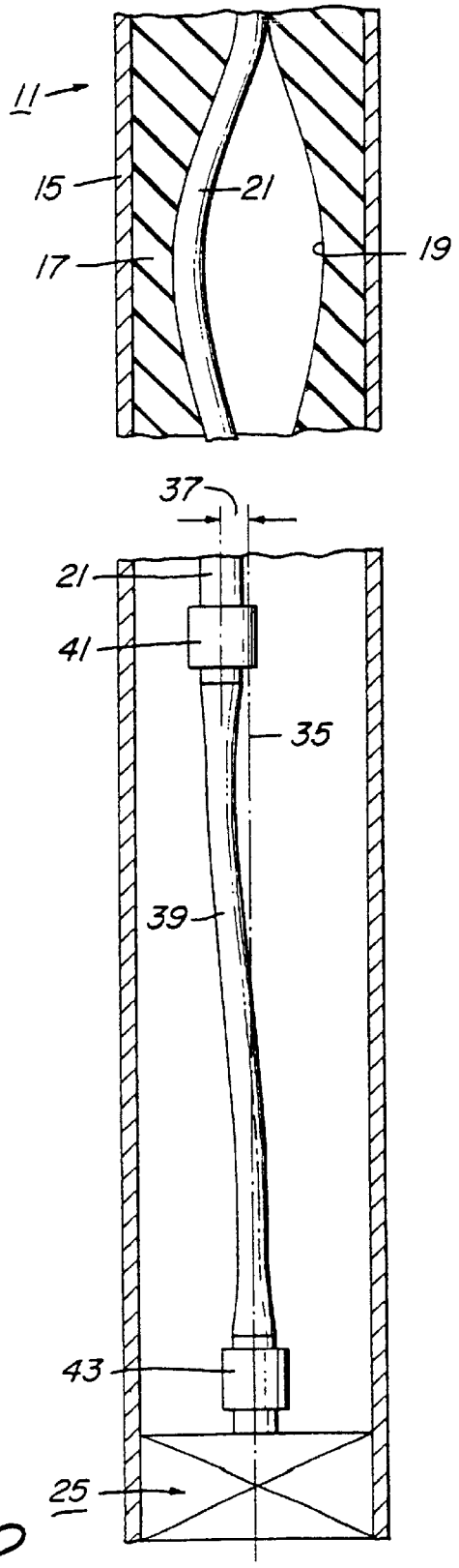
FIG. 2 is a schematic sectional view illustrating portions of the pump and a connector assembly for the pump assembly of FIG. 1.

Referring to FIG. 1, the downhole pump assembly includes a pump 11 which is suspended on a string of tubing 13 in the well. Pump 11 is of a progressive cavity type. Referring to FIG. 2, pump 11 has a tubular housing 15 which contains an elastomeric stator 17. Stator 17 is a stationary elastomeric member having double helical cavities 19 throughout its length. A rotor 21 of single helical configuration extends through the cavities 19. Rotor 21 is a solid steel member that is rotated for causing pumping action.

Referring again to FIG. 1, a connector 23 is located at the lower end of pump 11. Connector 23 is secured to the upper end of a seal section 25. Seal section 25 is a conventional member which has a thrust bearing and a pressure equalizing section. Seal section 25 in the embodiment shown secures to a speed reduction transmission 27. Transmission 27 is mounted to the upper end of electrical motor 29 for reducing the speed of an output drive shaft. A power cable 31 extends from the surface for supplying electrical power to motor 29. Intake 33 is located in connector 23 for supplying well fluid to pump 11.

Referring to the schematic illustration in FIG. 2, connector 23 has a longitudinal axis 35 that coincides with the longitudinal axis of pump 11. The upper end of rotor 21 will orbit eccentrically relative to axis 35, as indicated by the numeral 37. The amount of lateral deviation from the axis 35 is typically about ⅛ to ¼ inch. Rotor 21 is connected to a connector shaft 39 by a rotor coupling 41. Rotor coupling 41 forms a rigid connection which causes the upper end of connector shaft 39 to orbit in unison with the lower end of rotor 21. The lower end of connector shaft 39 connects to a drive shaft coupling 43, which is also a rigid coupling. Drive shaft coupling 43 rotates concentrically on the longitudinal axis 35. The numeral 25 in FIG. 2 indicates schematically the seal section, which includes a thrust bearing which absorbs downthrust on connector shaft 39 due to the pumping action of rotor 21 of pump 11.

Connector shaft 39 will flex along its length because of the orbiting movement of its upper end. Connector shaft 39 is a solid steel member with a diameter and length selected so as to allow the flexing action to occur without any permanent deformation. Shaft 39 is designed so that neither the yield strength, fatigue life, nor buckling design load is exceeded by the flexing due to the lateral movement of its upper end.

Figure 3:
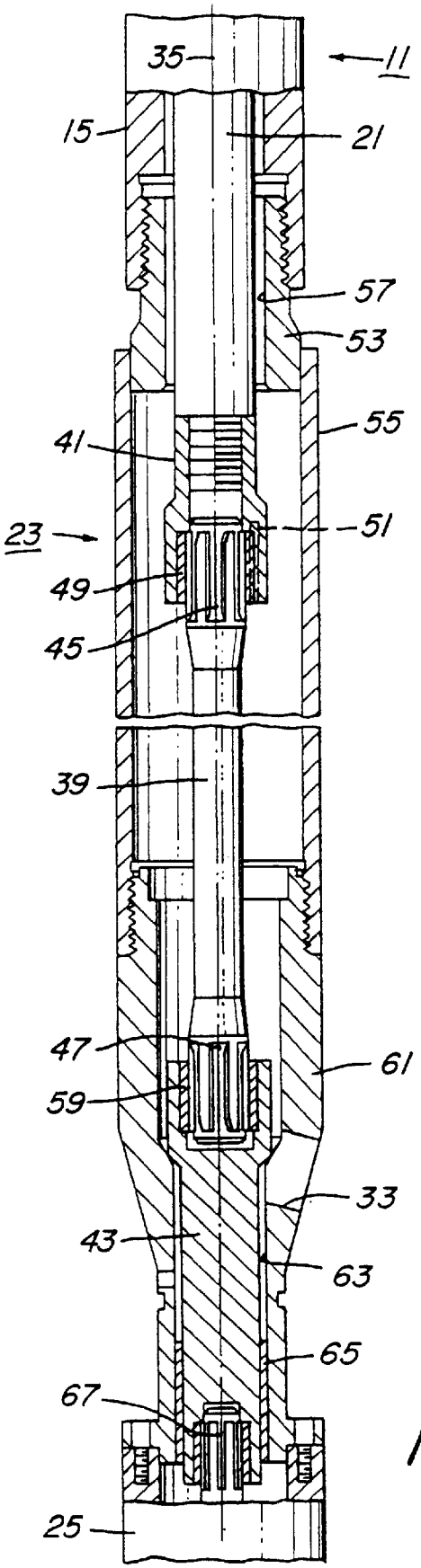
FIG. 3 is a sectional view illustrating the connector assembly for the pump assembly of FIG. 1.

Referring to FIG. 3, connector 23 is shown in more detail. The connector shaft 39 has a splined upper or rotor end 45. Similarly, the lower end or drive shaft end 47 of connector shaft 39 has identical splines to rotor end 45. The splines of rotor end 45 extend longitudinally in a conventional manner in an upset section of the upper end of connector shaft 39. The splines of rotor end 45 are parallel to the longitudinal axis and evenly spaced apart circumferentially around connector shaft 39. The splined rotor end 45 locates within a cavity formed in the lower end of rotor coupling 41. Preferably, a sleeve 49 is secured by key 51 in the cavity of rotor coupling 41. Sleeve 49 has splines that mate with the splined rotor end 45.

The rotor coupling 41 extends downward from the lower end of rotor 41 through an adapter 53. Adapter 53 connects a tubular connector housing 55 of connector 23 to pump 11. Pump end adapter 53 has an axial bore 57 extending through it. Bore 57 has a greater diameter than the outer diameter of rotor coupling 41 by a sufficient amount so as to allow a clearance for the eccentric movement.

The splined drive shaft end 47 of connector shaft 39 inserts slidingly into a splined sleeve 59. Splined sleeve 59 is secured by a key to drive shaft coupling 43. Drive shaft coupling 43 extends through a seal section adapter 61, which secures connector housing 55 to seal section 25. Seal section adapter 61 has an axial bore extending through it. Guide means comprising a guide bushing 65 is located within seal section adapter 61 for maintaining drive shaft coupling 43 in coaxial rotation. Guide bushing 65 serves as a radial bearing to provide radial support for the drive shaft coupling 43 and prevent any orbiting movement of drive shaft coupling 43. Guide bushing 65 is mounted in bore 63 stationarily, and rotatably and slidably receives a lower portion of drive shaft coupling 43. The lower end of drive shaft coupling 43 is a splined cavity for coupling to a drive shaft 67 which is driven by motor 29 (FIG. 1).

By way of example, in one embodiment, the thrust load requires a motor 29 of approximately 20–30 horsepower. The connector shaft 39 is about 1¼ inches in diameter and approximately 7½ feet long.

In operation, the pump assembly will be assembled as shown in FIG. 1 and lowered into a well on a string of tubing 13. Electrical cable 31 will be strapped to tubing 13 as the assembly is lowered into the well. Once in place, electrical power is supplied to motor 29. This causes drive shaft 67 (FIG. 3) to rotate, which in turn rotates connector shaft 39 and rotor 21 (FIG. 2). The drive shaft 67 speed is lower than the speed of motor 29 because of transmission 27. Well fluid will be drawn in through intake 33 (FIGS. 1, 3), flowing through connector housing 55 into pump 11. Pump 11 will discharge the fluid out the upper end into tubing 13, where it flows to the surface. Rotor 21 will orbit in an eccentric fashion as indicated by numeral 37. The rotor end 45 will orbit in unison with the lower end of rotor 21 while the drive shaft end 47 will remain coaxial with longitudinal axis 35. Drive shaft 39 will flex along its length.

The invention has significant advantages. The splined ends on the connector shaft provide an economical type of attachment between the drive shaft and the rotor. The connector shaft is allowed to flex to accommodate the orbiting movement. The splined ends and splined couplings are less expensive than prior art U-joint types.

While the invention has been shown in only one of its forms, it should be apparent to those skilled in the art that it is not so limited, but is susceptible to various changes without departing from the scope of the invention.

We claim:

1. In a pump assembly having a progressive cavity pump with a stator and a rotor, a motor which rotates a drive shaft for rotating the rotor in orbiting motion, an improved coupling between the motor and the pump, comprising:

a connector shaft having a splined rotor end and a splined drive shaft end;

a rotor coupling connected to the rotor for orbiting movement therewith and having an internal splined receptacle which slides over the rotor end of the connector shaft to cause the rotor end of the connector shaft to orbit in unison with the rotor;

a drive shaft coupling connected to the drive shaft and having an internal splined receptacle which slides over the drive shaft end of the connector shaft; and a guide means for restraining the drive shaft from orbiting motion, the connector shaft having sufficient flexibility to accommodate the orbiting movement of its rotor end.

2. The pump assembly according to claim 1, wherein the connector shaft is a solid steel member.

3. The pump assembly according to claim 1, further comprising:

a connector shaft housing which encloses the connector shaft, and wherein the guide means comprises:

a radial bearing mounted in the housing in engagement with the drive shaft coupling.

4. The pump assembly according to claim 1, further comprising:

a connector shaft housing which encloses the connector shaft, and wherein the pump has a well fluid intake which is located in the connector shaft housing.

5. In a pump, comprising in combination:

a progressive cavity pump having a stator, and a rotor which rotates eccentrically;

a solid steel connector shaft having a splined rotor end and a splined drive shaft end;

a rotor coupling connected to the rotor for eccentric movement therewith and having an internal splined receptacle which slides over the rotor end of the connector shaft to cause the rotor end of the connector shaft to rotate eccentrically in unison with the rotor, a motor assembly which rotates a drive shaft which has a splined end;

a drive shaft coupling having internal splines which slide over the drive shaft end of the connector shaft and splines which connect to the splined end of the drive shaft;

a connector housing which encloses the connector shaft and the couplings and which is connected between the pump and the motor assembly;

the connector housing having an intake port for admitting well fluid to the interior of the connector housing which flows into the pump housing; and a bushing sleeve in the connector housing which rotatably engages the drive shaft coupling to prevent eccentric movement of the drive shaft coupling, the connector shaft having sufficient radial flexibility to accommodate the eccentric movement of its rotor end.

6. The pump according to claim 5 wherein the motor assembly comprises:

an electric motor; and a seal section located between the connector housing and the motor for sealing well fluid from the motor, equalizing well fluid pressure with lubricant contained in the motor and for absorbing pump thrust.

*7. In a pump assembly having a progressive cavity pump with a stator and a rotor, a motor which rotates a drive shaft for rotating the rotor in orbiting motion, an improved coupling between the motor and the pump, comprising:*

*a connector shaft having a rotor end and a drive shaft end, wherein at least one of the ends is splined;*

*a rotor coupling connected to the rotor for orbiting movement therewith and having an end which mates with the rotor end of the connector shaft to orbit in unison with the rotor;*

*a drive shaft coupling connected to the drive shaft and having an end which mates with the drive shaft end of the connector shaft; and*

*a guide mounted in engagement with the drive shaft coupling for restraining the drive shaft from orbiting motion, the connector shaft having sufficient flexibility to accommodate the orbiting movement of its rotor end.*

*8. The pump assembly according to claim 7, wherein the connector shaft is a solid steel member.*

*9. The pump assembly according to claim 7, further comprising:*

*a connector shaft housing which encloses the connector shaft; and wherein the guide comprises:*

*a radial bearing mounted in the housing in engagement with the drive shaft coupling.*

*10. The pump assembly according to claim 7, further comprising:*

*a connector shaft housing which encloses the connector shaft; and wherein*

*the pump has a well fluid intake which is located in the connector shaft housing.*

*11. A pump assembly, comprising in combination:*

*a progressive cavity pump having a stator and a rotor which rotates eccentrically;*

*a solid steel connector shaft having a rotor end connected to the rotor for eccentric movement therewith and a splined drive shaft end containing a plurality of splines;*

*a motor assembly which rotates a drive shaft;*

*a drive shaft coupling connected to the drive shaft and having a splined end which mates in sliding engagement with the splines of the drive shaft end of the connector shaft to cause the rotor to rotate;*

*a connector housing which encloses the connector shaft and the couplings and which is connected between the pump and the motor assembly;*

*the connector housing having an intake port for admitting well fluid to the interior of the connector housing which flows into the pump; and*

*a bushing sleeve in the connector housing which rotatably engages the drive shaft coupling to prevent eccentric movement of the drive shaft coupling, the connector shaft having sufficient radial flexibility to accommodate the eccentric movement of its rotor end.*

*12. The pump assembly according to claim 11 wherein the motor assembly comprises:*

*an electric motor; and*

*a seal section located between the connector housing and the motor for sealing well fluid from the motor, equalizing well fluid pressure with lubricant contained in the motor and for absorbing pump thrust.*

* * * * *